Jan. 30, 1940.  J. G. JACKSON  2,188,549
CENTERING DEVICE FOR HEARTH BREAD PAN SETS
Filed Oct. 23, 1937  2 Sheets-Sheet 1

Inventor
Joseph G. Jackson.
By Stanley Hoods
Attorney.

Jan. 30, 1940.  J. G. JACKSON  2,188,549
CENTERING DEVICE FOR HEARTH BREAD PAN SETS
Filed Oct. 23, 1937  2 Sheets-Sheet 2

Inventor
Joseph G. Jackson
By Stanley Hoods
Attorney.

Patented Jan. 30, 1940

2,188,549

UNITED STATES PATENT OFFICE 2,188,549

CENTERING DEVICE FOR HEARTH BREAD PAN SETS

Joseph G. Jackson, Oak Park, Ill., assignor to The Edward Katzinger Company, Chicago, Ill., a corporation of Illinois Application October 23, 1937, Serial No. 170,524

6 Claims. (Cl. 53—6)

This invention relates to baking pan sets comprising individual pans having side walls relatively lower than the end walls thereof, such as hearth bread pans, having as its object the provision of means whereby a plurality of such pan sets may be stacked by nesting one into the other while maintaining a spaced relation between the walls and elements of said pans when nested.

With the above and other objects in view, as will be apparent, this invention consists in the construction, combination and arrangement of parts, all as hereinafter more fully described, claimed and illustrated in the accompanying drawings, wherein:

Figure 1:
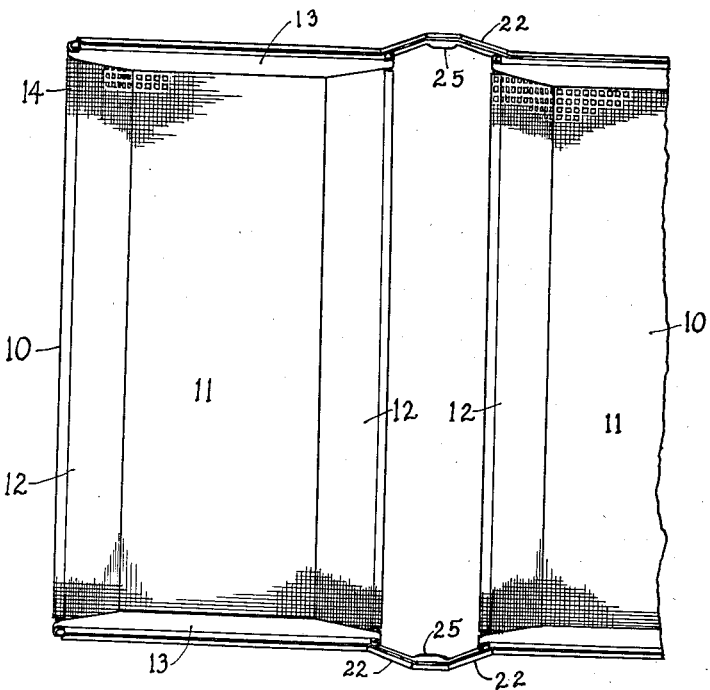
Fig. 1 is a fragmentary plan view of a pan set embodying the features of this invention.

In baking pan sets, whether of the ordinary type or those in which the individual pans have side walls relatively lower than the end walls thereof, it is customary to nest one set within an adjoining set so as to stack the same in a minimum amount of space.

In order to permit baking pans of this character, particularly hearth bread pans having bottoms and walls of foraminated sheet metal and consequently relatively delicate construction, to be nested and stacked as proposed, it is desirable to retain the subjacent pans in relatively fixed spaced relationship thereby avoiding damage to the pans which arises in ordinary handling when relative transverse or longitudinal movement of subjacent pans is permitted.

The present invention accordingly contemplates the stacking or nesting of baking pan sets, one in the other, with the bottoms and walls thereof in relatively fixed spaced relationship so that relative movement between subjacent pans of the stack may be minimized.

The pan set illustrated in the drawings consists of a plurality of pans 10 each having bottom portion 11, outwardly sloping side walls 12 and end walls 13 relatively higher than the side walls 12. It is to be noted that the bottom 11 and side walls 12 are provided with perforations 14 of any suitable design so as to provide proper support for the contents and at the same time afford complete circulation of air thereto as required in the baking of hearth or crust bread and the like. The present invention, however, is equally applicable to pans of solid bottom and wall construction.

Flanges or tongues 15 forming continuations of the upper limits of the pan walls 12 and 13 are crimped about a rectangular frame 16 of relatively heavy wire or the like to form a reinforcing bead 17. The frame 16 is bent downwardly at the extremities of the end walls 13 in order to accommodate variation in height between the side walls 12 and the end walls 13.

Extending along the aligned end walls 13 of the pans and fastened thereto by means of rivets 18 are straps 19, whereby the pans 10 are maintained in predetermined spaced relationship. The longitudinal edges of the strap 19 are formed with beads 20, the uppermost of which coacts with the bead 17 extending the length of each of the pan end walls 13. The lower bead 20 serves to limit the depth to which a subjacent pan set may be disposed in nested relation thereto.

Each strap opposite the space defined by adjacent limits of the pan end walls 13 is bent slightly outwardly as at 22 whereby the space between the side wall beads 17 of adjacent pans, adjacent upper bead 20 of the strap 19 provides an upwardly opening recess. The lower bead 20 of the strap 19 is flattened at 23 to form a tongue 25 which extends below the limits of the lower edge of bottom bead 20 of the strap 19. It will be observed that the tongue 25 thus provided lies in a vertical plane passing centrally through the recess or space hereinbefore referred to at the upper edge of the strap 19. Consequently, when the pan units are stacked, one upon the other, the tongue 25 depending from the strap 19 of the upper pan is adapted to enter the upwardly opening recess defined by the strap 19 of the lower pan, the longitudinal edge of the lower beads of the strap 19 of the upper pan, and the adjacent edge of the upper bead on the strap 19 of the lower pan cooperating to limit the depth to which the tongue 25 enters said recess. The design and shape of the tongue 25 may be varied as desired consistent with affording sufficient play relative to the recess to prevent a wedging engagement.

Figure 2:
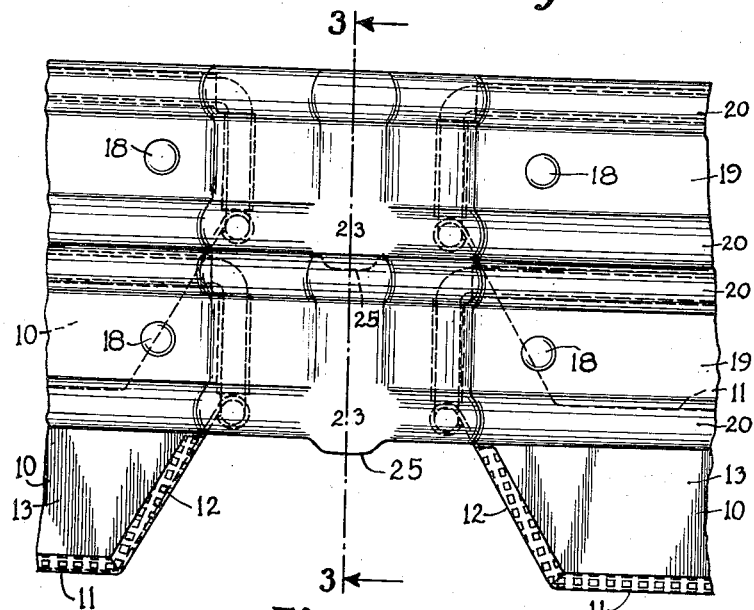
Fig. 2 is an enlarged fragmentary side elevation of two pan sets, illustrating the same nested, one within the other.
Figure 3:
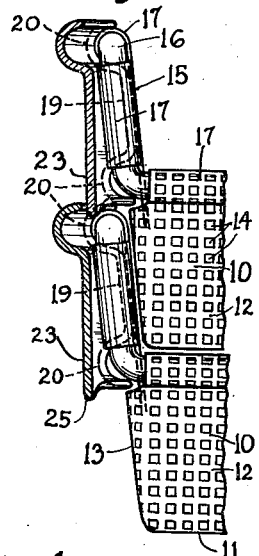
Fig. 3 is a sectional view taken on line 3—3 of Fig. 2.
Figure 4:
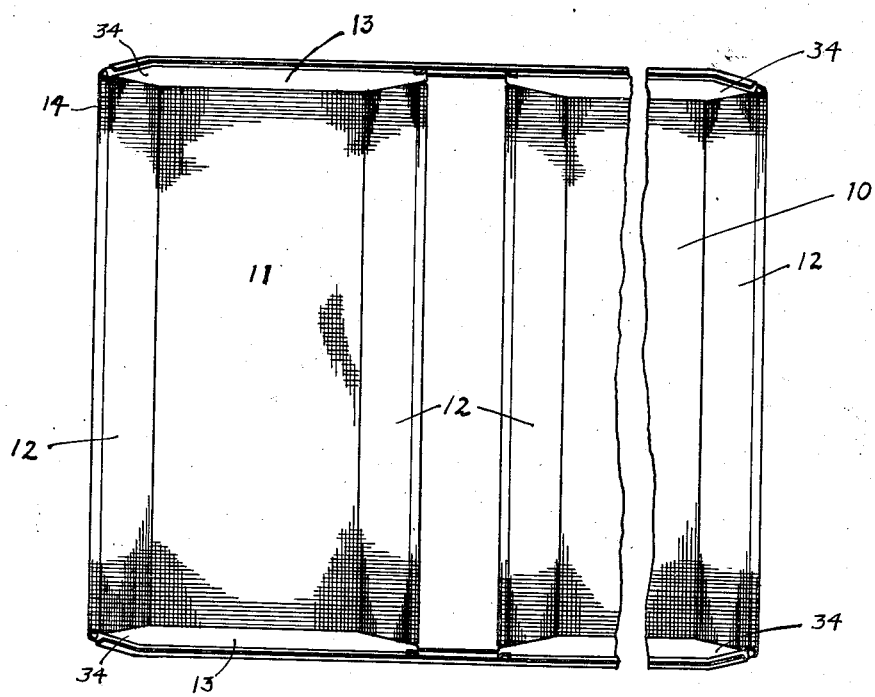
Fig. 4 is a fragmentary plan view of a pan set embodying a modified form of centering device.
Figure 5:
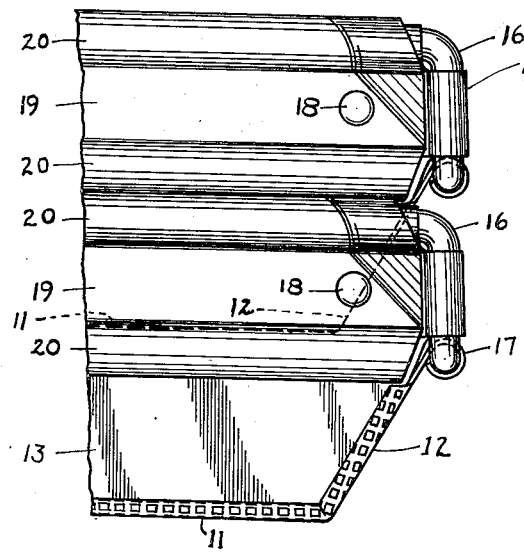
Fig. 5 is an enlarged fragmentary side elevation of two pan sets arranged in nested relation.
Figure 6:
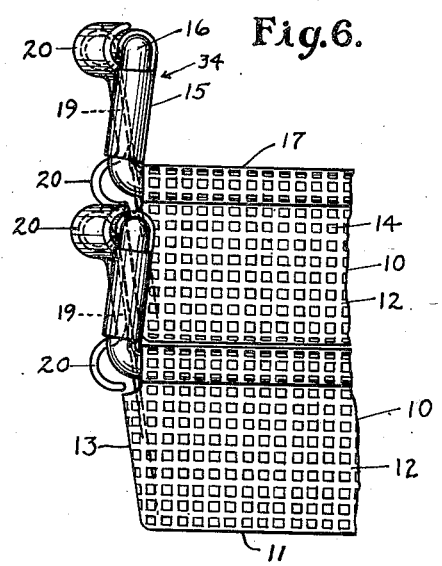
Fig. 6 is a fragmentary end elevation of the pan sets arranged as in Fig. 5.

The pan sets disclosed in Figs. 4, 5 and 6 are identical with the construction shown in Figs. 1, 2 and 3, except for the provision of means at the four outermost corners of the set for maintaining a superposed set in non-shifting relation thereto, instead of the tongue 25 and recess-forming bulge 22 in the strap 19 typical of the centering device shown in said Figs. 1, 2 and 3. This modification consists in inwardly bending a portion of the end walls of the endmost pans of the set to provide ears 34 having an upper edge in diagonal relation to the corner defined by vertical planes through the upper edges of side and end walls of the outermost pans of the set. Entering portions, to-wit the corners defined by the outer side walls of the endmost pans at their juncture with the outer ends of the end walls of the endmost pans of a superposed set, are engaged by the upper edge of said ears 34, with the result that longitudinal or transverse shifting of the pan sets relative to each other is prevented. The surfaces of the pan wall of which the ears 34 form a part do not ordinarily contact the contents of the pan so that discoloration or irregularities, if any, on the inner face of the ear 34 caused by rubbing against the entering portions of a pan nested thereagainst, will not be transferred to the contents of the pan.

What is claimed is:

1. The combination with a plurality of baking pans each having upwardly and outwardly inclined end walls and relatively low upwardly and outwardly inclined side walls, said pans being arranged in spaced parallel relation with the corresponding end walls aligned one with the other, a strap positioned against the outer surfaces of said end walls and secured thereto to combine said pans in a set, stops associated with said straps to limit the depth of nesting of said set in a subjacent set, and means projecting laterally from the plane of the strap and above the level of the upper edges of the side walls of the pans for externally engaging entering portions of a superposed pan set when said sets are in nested relation for maintaining predetermined spaced relation between the walls and elements of said pans when nested.

2. The combination with a plurality of baking pans each having upwardly and outwardly inclined end walls and relatively low side walls, said pans being arranged in spaced parallel relation with the corresponding end walls aligned one with the other, a strap positioned against the outer surfaces of said end walls and secured thereto to combine said pans in a set and to limit the depth of nesting of said set in a subjacent set, and means projecting laterally from the plane of the strap and above the level of the upper edges of the side walls of the pans for externally engaging entering portions of a superposed pan set when said sets are in nested relation whereby predetermined spaced relation is maintained between the walls and elements of said pans when nested.

3. The combination with a plurality of baking pans each having upwardly and outwardly inclined end walls and relatively low side walls, said pans being arranged in spaced parallel relation with the corresponding end walls aligned one with the other, means to combine said pans in a set, stops associated with the ends walls to maintain the side walls of the pans of one set in substantially non-nested relation to the side walls of the pans of a subjacent set while the end walls of the pans of said sets are in nested relation, and means projecting laterally from the upper portion of the end walls of the pans for externally engaging entering portions of a superposed pan set when said sets are in nested relation whereby predetermined spaced relation is maintained between the walls and elements of said pans when nested.

4. The combination with a plurality of baking pans each having upwardly and outwardly inclined end walls and relatively low side walls, said pans being arranged in spaced parallel relation with the corresponding end walls aligned one with the other, means to combine said pans in a set, stops associated with the end walls to maintain the side walls of the pans of one set in substantially non-nested relation to the side walls of the pans of a subjacent set while the end walls of the pans of said sets are in nested relation, and means projecting inwardly from the upper portion of the end walls of the endmost pans of the set for externally engaging entering portions of a superposed pan set when said sets are in nested relation whereby predetermined spaced relation is maintained between the walls and elements of said pans when nested.

5. The combination with a plurality of baking pans each having upwardly and outwardly inclined end walls and relatively low side walls, said pans being arranged in spaced parallel relation with the corresponding end walls aligned one with the other, means to combine said pans in a set, stops associated with the end walls to limit the depth of nesting of the pans of one set within the pans of a subjacent set, and ears formed integrally with a portion of the end walls of the endmost pans of the set above the upper edges of the outermost side walls of the endmost pans of the set for externally engaging entering portions of a superposed pan set when said sets are in nested relation whereby predetermined spaced relation is maintained between the walls and elements of said pans when nested.

6. The combination with a plurality of baking pans each having upwardly and outwardly inclined end walls and relatively low side walls, said pans being arranged in spaced parallel relation with the corresponding end walls aligned one with the other, means for reinforcing the edges of said walls comprising a continuous wire frame fixed to the edges of the side and end walls, means for combining said pans in a set, stops associated with the end walls to maintain the side walls of the pans of one set in substantially non-nested relation to the side walls of the pans of a subjacent set while the end walls of the pans of said sets are in nested relation, a portion of the end walls of the endmost pans of the set being bent inwardly to provide an ear in a plane oblique to both the outer side walls and end walls of said pans against which the entering portions of a superposed pan set may be engaged to maintain predetermined spaced relation between the walls and elements of said pans when nested.

JOSEPH G. JACKSON.